(12) United States Patent
Denis et al.

(10) Patent No.: US 12,145,226 B2
(45) Date of Patent: Nov. 19, 2024

(54) SENSOR-BASED POWER CONTROLS FOR A WELDING SYSTEM

(71) Applicant: ILLINOIS TOOL WORKS INC., Glenview, IL (US)

(72) Inventors: Marc Lee Denis, Lena, WI (US); Christopher Hsu, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 730 days.

(21) Appl. No.: 16/270,241

(22) Filed: Feb. 7, 2019

(65) Prior Publication Data

US 2019/0168333 A1    Jun. 6, 2019

Related U.S. Application Data

(63) Continuation of application No. 14/516,281, filed on Oct. 16, 2014, now Pat. No. 10,239,147.

(51) Int. Cl.
*B23K 9/10* (2006.01)
*B23K 9/095* (2006.01)

(52) U.S. Cl.
CPC .......... *B23K 9/1087* (2013.01); *B23K 9/0956* (2013.01); *B23K 9/1006* (2013.01)

(58) Field of Classification Search
CPC ...... B23K 9/10; B23K 9/1056; B23K 9/1006; B23K 9/1087; B23K 9/1062; B23K 9/0956

See application file for complete search history.

(56) References Cited

U.S. PATENT DOCUMENTS

| | | |
|---|---|---|
| 1,340,270 A | 5/1920 | Emil |
| 2,045,800 A | 6/1936 | Walther |
| 2,045,801 A | 6/1936 | Richter |
| 2,045,802 A | 6/1936 | Walther |
| 2,333,192 A | 10/1942 | Moberg |
| 2,351,910 A | 6/1944 | Blankenbuehler |
| 3,391,691 A | 7/1968 | Young |
| 3,651,290 A | 3/1972 | Durbin |
| 3,679,865 A | 7/1972 | Jesnitzer |
| 3,867,769 A | 2/1975 | Schow |
| 4,028,522 A | 6/1977 | Chihoski |

(Continued)

FOREIGN PATENT DOCUMENTS

| | | |
|---|---|---|
| CA | 2298208 | 8/2000 |
| CA | 2311685 | 12/2001 |

(Continued)

OTHER PUBLICATIONS

"Low Cost Virtual Reality Welding Training System," NSRP Joint Panel Meeting, Apr. 21, 2010, http://www.nsrp.org/6-Presentations/Joint/042110_Low_Cost_Virtual_Reality_Welder_Training_System_Fast.pdf.

(Continued)

*Primary Examiner* — Hung D Nguyen
(74) *Attorney, Agent, or Firm* — McAndrews, Held & Malloy, Ltd.

(57) ABSTRACT

A welding system includes a torch motion sensing system associated with a welding torch and is configured to sense welding torch orientations or movements. The welding system also includes a processing system that is configured to vary operation of a power source based on the sensed orientations or movements.

10 Claims, 4 Drawing Sheets

(56) References Cited

U.S. PATENT DOCUMENTS

| | | | |
|---|---|---|---|
| 4,041,615 | A | 8/1977 | Whitehill |
| 4,044,377 | A | 8/1977 | Bowerman |
| 4,124,944 | A | 11/1978 | Blair |
| 4,132,014 | A | 1/1979 | Schow |
| 4,144,766 | A | 3/1979 | Wehrmeister |
| 4,163,886 | A | 8/1979 | Omae |
| 4,224,501 | A | 9/1980 | Lindbom |
| 4,253,648 | A | 3/1981 | Meeks |
| 4,294,440 | A | 10/1981 | Severt |
| 4,375,026 | A | 2/1983 | Kearney |
| 4,375,165 | A | 3/1983 | deSterke |
| 4,380,696 | A * | 4/1983 | Masaki ............... B25J 19/023 219/124.34 |
| 4,389,561 | A | 6/1983 | Weman |
| 4,396,945 | A | 8/1983 | DiMatteo |
| 4,412,121 | A | 10/1983 | Kremers |
| 4,452,589 | A | 6/1984 | Denison |
| 4,459,114 | A | 7/1984 | Barwick |
| 4,471,207 | A | 9/1984 | Hawkes |
| 4,484,059 | A | 11/1984 | Lillquist |
| 4,518,361 | A | 5/1985 | Conway |
| 4,541,055 | A | 9/1985 | Wolfe |
| 4,555,614 | A | 11/1985 | Morris |
| 4,577,499 | A | 3/1986 | Silke |
| 4,590,356 | A | 5/1986 | Povlick |
| 4,591,689 | A | 5/1986 | Brown |
| 4,594,497 | A | 6/1986 | Takahashi |
| 4,595,186 | A | 6/1986 | Reed |
| 4,595,368 | A | 6/1986 | Cole |
| 4,595,820 | A | 6/1986 | Richardson |
| 4,609,806 | A | 9/1986 | Grabkowski |
| 4,628,176 | A | 12/1986 | Kojima |
| 4,638,146 | A | 1/1987 | Koyama |
| 4,677,277 | A | 6/1987 | Cook |
| 4,680,014 | A | 7/1987 | Paton |
| 4,689,021 | A | 8/1987 | Vasiliev |
| 4,716,273 | A | 12/1987 | Paton |
| 4,721,947 | A | 1/1988 | Brown |
| 4,728,768 | A | 3/1988 | Cueman |
| 4,739,404 | A | 4/1988 | Richardson |
| 4,767,109 | A | 8/1988 | Raketich |
| 4,829,365 | A | 5/1989 | Eichenlaub |
| 4,830,261 | A | 5/1989 | Mello |
| 4,867,685 | A | 9/1989 | Brush |
| 4,868,649 | A | 9/1989 | Gaudin |
| 4,877,940 | A | 10/1989 | Bangs |
| 4,881,678 | A | 11/1989 | Gaudin |
| 4,920,249 | A | 4/1990 | McLaughlin |
| 4,931,018 | A | 6/1990 | Herbst et al. |
| 4,937,427 | A | 6/1990 | McVicker |
| 4,943,702 | A | 7/1990 | Richardson |
| 4,954,690 | A | 9/1990 | Kensrue |
| 4,992,881 | A | 2/1991 | Tomasek |
| 4,996,409 | A | 2/1991 | Paton |
| 5,061,841 | A | 10/1991 | Richardson |
| 5,103,376 | A | 4/1992 | Blonder |
| 5,185,561 | A | 2/1993 | Good |
| 5,208,436 | A | 5/1993 | Blankenship |
| 5,211,564 | A | 8/1993 | Martinez |
| 5,231,928 | A | 8/1993 | Phillips |
| 5,283,418 | A | 2/1994 | Bellows |
| 5,302,799 | A | 4/1994 | Kennedy |
| 5,304,774 | A | 4/1994 | Durheim |
| 5,306,893 | A | 4/1994 | Morris |
| 5,320,538 | A | 6/1994 | Baum |
| 5,343,011 | A | 8/1994 | Fujii |
| 5,380,978 | A | 1/1995 | Pryor |
| 5,397,872 | A | 3/1995 | Baker |
| 5,404,181 | A | 4/1995 | Hung |
| 5,426,732 | A | 6/1995 | Boies |
| 5,448,405 | A | 9/1995 | Clausen |
| 5,464,957 | A | 11/1995 | Kidwell |
| 5,508,757 | A | 4/1996 | Chen |
| 5,514,846 | A | 5/1996 | Cecil |
| 5,517,420 | A | 5/1996 | Kinsman |
| 5,521,843 | A | 5/1996 | Hashima |
| 5,533,146 | A | 7/1996 | Iwai |
| 5,543,863 | A | 8/1996 | Lin |
| 5,546,476 | A | 8/1996 | Mitaka |
| 5,571,431 | A | 11/1996 | Lantieri |
| 5,592,241 | A | 1/1997 | Kita |
| 5,617,335 | A | 4/1997 | Hashima |
| 5,659,479 | A | 8/1997 | Duley |
| 5,668,612 | A | 9/1997 | Hung |
| 5,674,415 | A | 10/1997 | Leong |
| 5,675,229 | A | 10/1997 | Thorne |
| 5,681,490 | A | 10/1997 | Chang |
| 5,708,253 | A | 1/1998 | Bloch |
| 5,709,219 | A | 1/1998 | Chen |
| 5,747,042 | A | 5/1998 | Choquet |
| 5,823,785 | A | 10/1998 | Matherne, Jr. |
| 5,832,139 | A | 11/1998 | Batterman |
| 5,856,844 | A | 1/1999 | Batterman |
| 5,930,093 | A | 7/1999 | Morrissett |
| 5,961,859 | A | 10/1999 | Chou |
| 5,973,677 | A | 10/1999 | Gibbons |
| 5,999,909 | A | 12/1999 | Rakshit |
| 6,003,052 | A | 12/1999 | Yamagata |
| 6,018,729 | A | 1/2000 | Zacharia |
| 6,019,359 | A | 2/2000 | Fly |
| 6,024,273 | A | 2/2000 | Ludewig |
| 6,039,494 | A | 3/2000 | Pearce |
| 6,046,754 | A | 4/2000 | Stanek |
| 6,049,059 | A | 4/2000 | Kim |
| 6,051,805 | A | 4/2000 | Vaidya |
| 6,101,455 | A | 8/2000 | Davis |
| 6,107,601 | A | 8/2000 | Shimagama |
| 6,130,407 | A | 10/2000 | Villafuerte |
| 6,136,946 | A | 10/2000 | Yao |
| 6,153,848 | A | 11/2000 | Nagae |
| 6,155,475 | A | 12/2000 | Ekelof |
| 6,163,946 | A | 12/2000 | Pryor |
| 6,225,590 | B1 * | 5/2001 | Farrow ............... B23K 11/252 219/86.41 |
| 6,226,395 | B1 | 5/2001 | Gilliland |
| 6,236,017 | B1 | 5/2001 | Smartt |
| 6,242,711 | B1 | 6/2001 | Cooper |
| 6,271,500 | B1 | 8/2001 | Hirayama |
| 6,288,359 | B1 | 9/2001 | Koch |
| 6,290,740 | B1 | 9/2001 | Schaefer |
| 6,301,763 | B1 | 10/2001 | Pryor |
| 6,315,186 | B1 | 11/2001 | Friedl |
| 6,329,635 | B1 | 12/2001 | Leong |
| 6,337,458 | B1 | 1/2002 | Lepeltier |
| 6,371,765 | B1 | 4/2002 | Wall |
| 6,417,894 | B1 | 7/2002 | Goff |
| 6,423,936 | B1 | 7/2002 | Reed |
| 6,441,342 | B1 | 8/2002 | Hsu |
| 6,445,964 | B1 | 9/2002 | White |
| 6,469,752 | B1 | 10/2002 | Ishikawa |
| 6,476,354 | B1 | 11/2002 | Jank |
| 6,479,793 | B1 | 11/2002 | Wittmann |
| 6,506,997 | B2 | 1/2003 | Matsuyama |
| 6,516,300 | B1 | 2/2003 | Rakshit |
| 6,572,379 | B1 | 6/2003 | Sears |
| 6,583,386 | B1 | 6/2003 | Ivkovich |
| 6,596,972 | B1 | 7/2003 | Di Novo |
| 6,614,002 | B2 | 9/2003 | Weber |
| 6,621,049 | B2 | 9/2003 | Suzuki |
| 6,622,906 | B1 | 9/2003 | Kushibe |
| 6,647,288 | B2 | 11/2003 | Madill |
| 6,670,574 | B1 | 12/2003 | Bates |
| 6,697,761 | B2 | 2/2004 | Akatsuka |
| 6,703,585 | B2 | 3/2004 | Suzuki |
| 6,710,298 | B2 | 3/2004 | Eriksson |
| 6,720,878 | B2 | 4/2004 | Jumpertz |
| 6,728,582 | B1 | 4/2004 | Wallack |
| 6,734,393 | B1 | 5/2004 | Friedl |
| 6,744,011 | B1 | 6/2004 | Hu |
| 6,748,249 | B1 | 6/2004 | Eromaki |
| 6,750,428 | B2 | 6/2004 | Okamoto |
| 6,753,909 | B1 | 6/2004 | Westerman |
| 6,768,974 | B1 | 7/2004 | Nanjundan |
| 6,839,049 | B1 | 1/2005 | Koizumi |

(56) References Cited

U.S. PATENT DOCUMENTS

| | | |
|---|---|---|
| 6,857,553 B1 | 2/2005 | Hartman |
| 6,868,726 B2 | 3/2005 | Lemkin |
| 6,910,971 B2 | 6/2005 | Alsenz |
| 6,927,360 B2 | 8/2005 | Artelsmair |
| 6,937,329 B2 | 8/2005 | Esmiller |
| 6,967,635 B2 | 11/2005 | Hung |
| 6,977,357 B2 | 12/2005 | Hsu |
| 6,995,536 B2 | 2/2006 | Challoner |
| 7,015,419 B2 | 3/2006 | Hackl |
| 7,025,053 B1 | 4/2006 | Altamirano |
| 7,032,814 B2 | 4/2006 | Blankenship |
| 7,045,742 B2 | 5/2006 | Feichtinger |
| 7,081,888 B2 | 7/2006 | Cok |
| 7,120,473 B1 | 10/2006 | Hawkins |
| 7,132,617 B2 | 11/2006 | Lee |
| 7,132,623 B2 | 11/2006 | DeMiranda |
| 7,150,047 B2 | 12/2006 | Fergason |
| 7,173,215 B1 | 2/2007 | Kapoor |
| 7,181,413 B2 | 2/2007 | Hadden |
| 7,226,176 B1 | 6/2007 | Huang |
| 7,261,261 B2 | 8/2007 | Ligertwood |
| 7,342,210 B2 | 3/2008 | Fergason |
| 7,358,458 B2 | 4/2008 | Daniel |
| 7,465,230 B2 | 12/2008 | LeMay |
| 7,474,760 B2 | 1/2009 | Hertzman |
| 7,523,069 B1 | 4/2009 | Friedl et al. |
| 7,564,005 B2 | 7/2009 | Cabanaw |
| 7,574,172 B2 | 8/2009 | Clark |
| 7,577,285 B2 | 8/2009 | Schwarz |
| 7,637,622 B2 | 12/2009 | Garbergs |
| D614,217 S | 4/2010 | Peters |
| 7,698,094 B2 | 4/2010 | Aratani |
| D615,573 S | 5/2010 | Peters |
| 7,766,213 B2 | 8/2010 | Henrikson |
| 7,789,811 B2 | 9/2010 | Cooper |
| 7,826,984 B2 | 11/2010 | Sjostrand |
| 7,831,098 B2 | 11/2010 | Melikian |
| 7,839,416 B2 | 11/2010 | Ebensberger |
| 7,845,560 B2 | 12/2010 | Emanuel |
| D631,074 S | 1/2011 | Peters |
| 7,899,618 B2 | 3/2011 | Ledet |
| 7,962,967 B2 | 6/2011 | Becker |
| 8,019,144 B2 | 9/2011 | Sugihara |
| 8,044,942 B1 | 10/2011 | Leonhard |
| 8,046,178 B2 | 10/2011 | Dai |
| 8,100,694 B2 | 1/2012 | Portoghese |
| 8,110,774 B2 | 2/2012 | Huonker |
| 8,125,094 B2 | 2/2012 | Radtke |
| 8,235,588 B2 | 8/2012 | Louban |
| 8,248,324 B2 | 8/2012 | Nangle |
| 8,274,013 B2 | 9/2012 | Wallace |
| 8,316,462 B2 | 11/2012 | Becker et al. |
| 8,393,519 B2 | 3/2013 | Allehaux |
| 8,406,682 B2 | 3/2013 | Elesseily |
| 8,431,862 B2 | 4/2013 | Kachline |
| 8,432,476 B2 | 4/2013 | Ashforth |
| 8,502,866 B2 | 8/2013 | Becker |
| 8,512,043 B2 | 8/2013 | Choquet |
| 8,541,746 B2 | 9/2013 | Andres |
| 8,569,655 B2 | 10/2013 | Cole |
| 8,657,605 B2 | 2/2014 | Wallace |
| 8,680,434 B2 | 3/2014 | Stoger et al. |
| 8,681,178 B1 | 3/2014 | Tseng |
| 8,692,157 B2 | 4/2014 | Daniel |
| 8,698,843 B2 | 4/2014 | Tseng |
| 8,747,116 B2 | 6/2014 | Zboray et al. |
| 8,834,168 B2 | 9/2014 | Peters |
| 8,851,896 B2 | 10/2014 | Wallace |
| 8,860,760 B2 | 10/2014 | Chen |
| 8,911,237 B2 | 12/2014 | Postlethwaite |
| 8,915,740 B2 | 12/2014 | Zboray |
| 8,946,595 B2 | 2/2015 | Ishida |
| 8,953,033 B2 | 2/2015 | Yamane |
| 8,953,909 B2 | 2/2015 | Guckenberger |
| RE45,398 E | 3/2015 | Wallace |
| 8,987,628 B2 | 3/2015 | Daniel et al. |
| 8,990,842 B2 | 3/2015 | Rowley |
| 8,992,226 B1 | 3/2015 | Leach |
| 9,011,154 B2 | 4/2015 | Kindig |
| 9,012,802 B2 | 4/2015 | Daniel |
| 9,050,678 B2 | 6/2015 | Daniel |
| 9,050,679 B2 | 6/2015 | Daniel |
| 9,089,921 B2 | 7/2015 | Daniel |
| 9,196,169 B2 | 11/2015 | Wallace |
| 9,218,745 B2 | 12/2015 | Choquet |
| 9,221,117 B2 | 12/2015 | Conrardy |
| 9,269,279 B2 | 2/2016 | Penrod et al. |
| 9,293,056 B2 | 3/2016 | Zboray |
| 9,293,057 B2 | 3/2016 | Zboray |
| 9,318,026 B2 | 4/2016 | Peters |
| 9,330,575 B2 | 5/2016 | Peters |
| 9,336,686 B2 | 5/2016 | Peters |
| 9,402,122 B2 | 7/2016 | Richardson |
| 9,511,443 B2 | 12/2016 | Pfeifer et al. |
| 2001/0026445 A1 | 10/2001 | Naghi |
| 2001/0032508 A1 | 10/2001 | Lemkin |
| 2002/0043607 A1 | 4/2002 | Tajima |
| 2002/0071550 A1 | 6/2002 | Pletikosa |
| 2002/0105797 A1 | 8/2002 | Navid |
| 2002/0114653 A1 | 8/2002 | Gatta |
| 2002/0148745 A1 | 10/2002 | Chang |
| 2002/0153354 A1 | 10/2002 | Norby |
| 2003/0011673 A1 | 1/2003 | Eriksson |
| 2003/0092496 A1 | 5/2003 | Alsenz |
| 2003/0172032 A1 | 9/2003 | Choquet |
| 2004/0058703 A1 | 3/2004 | Eromaki |
| 2004/0068335 A1 | 4/2004 | Ferla |
| 2004/0069754 A1 | 4/2004 | Bates |
| 2004/0175684 A1 | 9/2004 | Kaasa |
| 2004/0223148 A1 | 11/2004 | Takemura |
| 2004/0227730 A1 | 11/2004 | Sugihara |
| 2004/0251910 A1 | 12/2004 | Smith |
| 2005/0006363 A1 | 1/2005 | Hsu |
| 2005/0012598 A1 | 1/2005 | Berquist |
| 2005/0016979 A1 | 1/2005 | Stein |
| 2005/0017152 A1 | 1/2005 | Fergason |
| 2005/0073506 A1 | 4/2005 | Durso |
| 2005/0127052 A1 | 6/2005 | Spencer |
| 2005/0133488 A1 | 6/2005 | Blankenship |
| 2005/0135682 A1 | 6/2005 | Abrams |
| 2005/0179654 A1 | 8/2005 | Hawkins |
| 2005/0197115 A1 | 9/2005 | Clark et al. |
| 2005/0207102 A1 | 9/2005 | Russo |
| 2005/0227635 A1 | 10/2005 | Hawkins |
| 2005/0256611 A1 | 11/2005 | Pretlove |
| 2006/0010551 A1 | 1/2006 | Bishop |
| 2006/0081740 A1 | 4/2006 | Bellavance |
| 2006/0136183 A1 | 6/2006 | Choquet |
| 2006/0151446 A1 | 7/2006 | Schneider |
| 2006/0163228 A1 | 7/2006 | Daniel |
| 2006/0173619 A1 | 8/2006 | Brant |
| 2006/0212169 A1 | 9/2006 | Luthardt |
| 2006/0241432 A1 | 10/2006 | Herline |
| 2006/0285330 A1 | 12/2006 | Sundell |
| 2007/0038400 A1 | 2/2007 | Lee |
| 2007/0051711 A1 | 3/2007 | Kachline |
| 2007/0070358 A1* | 3/2007 | Ouchi .................. G06F 3/0346 356/614 |
| 2007/0114215 A1 | 5/2007 | Bill |
| 2007/0115202 A1 | 5/2007 | Kiesenhofer |
| 2007/0164006 A1 | 7/2007 | Burgstaller |
| 2007/0187378 A1 | 8/2007 | Karakas |
| 2007/0188606 A1 | 8/2007 | Atkinson |
| 2007/0221636 A1 | 9/2007 | Monzyk |
| 2007/0247793 A1 | 10/2007 | Carnevali |
| 2007/0248261 A1 | 10/2007 | Zhou |
| 2007/0264620 A1 | 11/2007 | Maddix |
| 2007/0278196 A1 | 12/2007 | James |
| 2007/0291166 A1 | 12/2007 | Misawa |
| 2008/0030631 A1 | 2/2008 | Gallagher |
| 2008/0038702 A1 | 2/2008 | Choquet |
| 2008/0061113 A9 | 3/2008 | Seki |
| 2008/0077422 A1 | 3/2008 | Dooley |
| 2008/0124698 A1 | 5/2008 | Ebensberger |

(56) References Cited

U.S. PATENT DOCUMENTS

| | | |
|---|---|---|
| 2008/0128395 A1 | 6/2008 | Aigner |
| 2008/0149602 A1 | 6/2008 | Lenzner |
| 2008/0149608 A1 | 6/2008 | Albrecht |
| 2008/0158502 A1 | 7/2008 | Becker |
| 2008/0168290 A1 | 7/2008 | Jobs |
| 2008/0169277 A1 | 7/2008 | Achtner |
| 2008/0234960 A1 | 9/2008 | Byington |
| 2008/0308541 A1 | 12/2008 | Hiroi |
| 2008/0314887 A1* | 12/2008 | Stoger .................. B23K 9/1276 219/137 R |
| 2009/0005728 A1 | 1/2009 | Weinert |
| 2009/0057286 A1 | 3/2009 | Ihara |
| 2009/0109128 A1 | 4/2009 | Nangle |
| 2009/0146359 A1 | 6/2009 | Canfield |
| 2009/0152251 A1 | 6/2009 | Dantinne |
| 2009/0161212 A1 | 6/2009 | Gough |
| 2009/0173726 A1 | 7/2009 | Davidson et al. |
| 2009/0189974 A1 | 7/2009 | Deering |
| 2009/0200281 A1 | 8/2009 | Hampton |
| 2009/0200282 A1 | 8/2009 | Hampton |
| 2009/0230107 A1 | 9/2009 | Ertmer |
| 2009/0231423 A1 | 9/2009 | Becker |
| 2009/0249606 A1 | 10/2009 | Diez |
| 2009/0283021 A1 | 11/2009 | Wong |
| 2009/0298024 A1 | 12/2009 | Batzler |
| 2009/0323121 A1 | 12/2009 | Valkenburg |
| 2010/0020483 A1 | 1/2010 | Ma |
| 2010/0048273 A1 | 2/2010 | Wallace |
| 2010/0053541 A1 | 3/2010 | Sundell |
| 2010/0062405 A1 | 3/2010 | Zboray |
| 2010/0062406 A1 | 3/2010 | Zboray |
| 2010/0088793 A1 | 4/2010 | Ghisleni |
| 2010/0123664 A1 | 5/2010 | Shin |
| 2010/0133247 A1 | 6/2010 | Mazumder |
| 2010/0133250 A1* | 6/2010 | Sardy .................... B23K 9/125 219/130.31 |
| 2010/0145520 A1 | 6/2010 | Gerio |
| 2010/0201803 A1 | 8/2010 | Melikian |
| 2010/0207620 A1 | 8/2010 | Gies |
| 2010/0224610 A1 | 9/2010 | Wallace |
| 2010/0238119 A1 | 9/2010 | Dubrovsky |
| 2010/0245273 A1 | 9/2010 | Hwang |
| 2010/0283588 A1 | 11/2010 | Gomez |
| 2010/0291313 A1 | 11/2010 | Ling |
| 2010/0314362 A1 | 12/2010 | Albrecht |
| 2011/0000892 A1 | 1/2011 | Mueller |
| 2011/0006047 A1 | 1/2011 | Penrod |
| 2011/0091846 A1 | 4/2011 | Kreindl |
| 2011/0092828 A1 | 4/2011 | Spohn |
| 2011/0114615 A1 | 5/2011 | Daniel |
| 2011/0117527 A1 | 5/2011 | Conrardy |
| 2011/0176720 A1 | 7/2011 | VanOsten |
| 2011/0183304 A1 | 7/2011 | Wallace |
| 2011/0220616 A1 | 9/2011 | Mehn |
| 2011/0220619 A1* | 9/2011 | Mehn .................. G01B 11/002 219/121.48 |
| 2011/0240605 A1 | 10/2011 | Takayama |
| 2011/0249090 A1 | 10/2011 | Moore |
| 2011/0284508 A1 | 11/2011 | Miura |
| 2011/0286005 A1 | 11/2011 | Yamamoto |
| 2011/0290765 A1 | 12/2011 | Albrecht |
| 2011/0313731 A1 | 12/2011 | Vock |
| 2011/0316516 A1 | 12/2011 | Schiefermuller |
| 2012/0007748 A1 | 1/2012 | Forgues |
| 2012/0012561 A1* | 1/2012 | Wiryadinata ........ B23K 9/1087 219/108 |
| 2012/0048838 A1 | 3/2012 | Ishida |
| 2012/0057240 A1 | 3/2012 | Sundell |
| 2012/0067859 A1 | 3/2012 | Albrecht |
| 2012/0072021 A1 | 3/2012 | Walser |
| 2012/0077174 A1 | 3/2012 | DePaul |
| 2012/0105476 A1 | 5/2012 | Tseng |
| 2012/0113512 A1 | 5/2012 | Tsanev |
| 2012/0122062 A1 | 5/2012 | Yang |
| 2012/0175834 A1 | 7/2012 | Hamm |
| 2012/0180180 A1 | 7/2012 | Steve |
| 2012/0188365 A1 | 7/2012 | Stork |
| 2012/0189993 A1 | 7/2012 | Kindig |
| 2012/0205359 A1 | 8/2012 | Daniel |
| 2012/0231894 A1 | 9/2012 | Nicora |
| 2012/0248080 A1 | 10/2012 | Hutchison |
| 2012/0248083 A1 | 10/2012 | Garvey |
| 2012/0273473 A1 | 11/2012 | Zhang |
| 2012/0280576 A1 | 11/2012 | Wood |
| 2012/0291172 A1 | 11/2012 | Wills |
| 2012/0298640 A1 | 11/2012 | Conrardy |
| 2012/0323496 A1 | 12/2012 | Burroughs |
| 2013/0040270 A1 | 2/2013 | Albrecht |
| 2013/0081293 A1 | 4/2013 | Delin |
| 2013/0182070 A1 | 7/2013 | Peters |
| 2013/0189656 A1 | 7/2013 | Zboray |
| 2013/0189657 A1 | 7/2013 | Wallace |
| 2013/0189658 A1 | 7/2013 | Peters |
| 2013/0200882 A1 | 8/2013 | Almalki |
| 2013/0206741 A1* | 8/2013 | Pfeifer .................... G01S 11/14 219/130.01 |
| 2013/0208569 A1 | 8/2013 | Pfeifer |
| 2013/0209976 A1 | 8/2013 | Postlethwaite |
| 2013/0262000 A1 | 10/2013 | Hutchison et al. |
| 2013/0264315 A1 | 10/2013 | Hung |
| 2013/0264322 A1 | 10/2013 | Bornemann |
| 2013/0288211 A1 | 10/2013 | Patterson |
| 2013/0291271 A1 | 11/2013 | Becker |
| 2013/0326842 A1 | 12/2013 | Pearson |
| 2014/0008088 A1 | 1/2014 | Chellew |
| 2014/0017642 A1 | 1/2014 | Postlethwaite |
| 2014/0017645 A1 | 1/2014 | Simpson |
| 2014/0042135 A1 | 2/2014 | Daniel et al. |
| 2014/0069899 A1 | 3/2014 | Mehn |
| 2014/0131337 A1 | 5/2014 | Williams |
| 2014/0134579 A1 | 5/2014 | Becker |
| 2014/0134580 A1 | 5/2014 | Becker |
| 2014/0140719 A1 | 5/2014 | Suzuki |
| 2014/0144896 A1 | 5/2014 | Einav |
| 2014/0184496 A1 | 7/2014 | Gribetz |
| 2014/0220522 A1 | 8/2014 | Peters |
| 2014/0234813 A1 | 8/2014 | Peters |
| 2014/0263224 A1 | 9/2014 | Becker |
| 2014/0263227 A1 | 9/2014 | Daniel et al. |
| 2014/0267773 A1 | 9/2014 | Jeung |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0315167 A1 | 10/2014 | Kreindl |
| 2014/0322684 A1 | 10/2014 | Wallace |
| 2014/0346158 A1 | 11/2014 | Matthews |
| 2014/0346793 A1 | 11/2014 | DeStories |
| 2014/0374396 A1 | 12/2014 | Luo et al. |
| 2015/0056584 A1 | 2/2015 | Boulware |
| 2015/0056585 A1 | 2/2015 | Boulware |
| 2015/0072323 A1 | 3/2015 | Postlethwaite |
| 2015/0154884 A1 | 6/2015 | Salsich |
| 2015/0170539 A1 | 6/2015 | Barrera |
| 2015/0190875 A1 | 7/2015 | Becker |
| 2015/0190876 A1 | 7/2015 | Becker |
| 2015/0190887 A1 | 7/2015 | Becker |
| 2015/0190888 A1 | 7/2015 | Becker |
| 2015/0194072 A1 | 7/2015 | Becker |
| 2015/0194073 A1 | 7/2015 | Becker |
| 2015/0209887 A1 | 7/2015 | DeLisio |
| 2015/0235565 A1 | 8/2015 | Postlethwaite |
| 2015/0248845 A1 | 9/2015 | Postlethwaite |
| 2015/0325153 A1 | 11/2015 | Albrecht |
| 2015/0375323 A1 | 12/2015 | Becker |
| 2015/0375324 A1 | 12/2015 | Becker |
| 2015/0375327 A1 | 12/2015 | Becker |
| 2015/0379894 A1 | 12/2015 | Becker |
| 2016/0039034 A1 | 2/2016 | Becker |
| 2016/0039053 A1 | 2/2016 | Becker |
| 2016/0049085 A1 | 2/2016 | Beeson |
| 2016/0093233 A1 | 3/2016 | Boulware |
| 2016/0125592 A1 | 5/2016 | Becker et al. |
| 2016/0125593 A1 | 5/2016 | Becker |

(56) References Cited

U.S. PATENT DOCUMENTS

| | | |
|---|---|---|
| 2016/0125594 A1 | 5/2016 | Becker |
| 2016/0125653 A1 | 5/2016 | Denis |
| 2016/0125761 A1 | 5/2016 | Becker |
| 2016/0125762 A1 | 5/2016 | Becker |
| 2016/0125763 A1 | 5/2016 | Becker |
| 2016/0125764 A1 | 5/2016 | Becker |
| 2016/0203734 A1 | 7/2016 | Boulware |
| 2016/0203735 A1 | 7/2016 | Boulware |
| 2016/0236303 A1 | 8/2016 | Matthews |
| 2017/0326674 A1 | 11/2017 | Dunbar |

FOREIGN PATENT DOCUMENTS

| | | | | |
|---|---|---|---|---|
| CA | 2517874 | | 12/2001 | |
| CA | 2549553 | | 7/2004 | |
| CA | 2554498 | | 4/2006 | |
| CA | 2841583 | | 2/2013 | |
| CN | 101203197 | | 6/2008 | |
| CN | 101323046 | | 12/2008 | |
| CN | 102378666 | | 3/2012 | |
| CN | 202877704 | | 4/2013 | |
| CN | 103983988 A * | | 8/2014 | ............ G01S 19/34 |
| CN | 104014906 | | 9/2014 | |
| DE | 202010011064 | | 10/2010 | |
| DE | 102010038902 | | 2/2012 | |
| EP | 0323277 | | 7/1989 | |
| EP | 0878263 | | 11/1998 | |
| EP | 0963744 | | 12/1999 | |
| EP | 1025946 | | 8/2000 | |
| EP | 1029306 | | 8/2000 | |
| EP | 1295195 | | 6/2001 | |
| EP | 1573699 | | 9/2005 | |
| EP | 1797545 | | 6/2007 | |
| EP | 1864744 | | 12/2007 | |
| EP | 2022592 | | 2/2009 | |
| EP | 2415560 | | 2/2014 | |
| ES | 2438440 | | 1/2014 | |
| FR | 1456780 | | 7/1966 | |
| FR | 2827066 | | 1/2003 | |
| FR | 2989141 A1 * | | 10/2013 | ............... B60K 6/48 |
| GB | 2454232 | | 5/2009 | |
| GB | 2454232 A | | 5/2009 | |
| JP | S5527422 | | 2/1980 | |
| JP | H05141909 | | 6/1993 | |
| JP | H11146387 | | 5/1999 | |
| JP | 2000298427 | | 10/2000 | |
| JP | 2004181493 | | 7/2004 | |
| JP | 2007021542 | | 2/2007 | |
| JP | 2009125790 | | 6/2009 | |
| KR | 100876425 | | 12/2008 | |
| KR | 20110017484 | | 2/2011 | |
| KR | 20130048580 | | 5/2013 | |
| SU | 972552 | | 11/1982 | |
| SU | 1354234 | | 11/1987 | |
| SU | 1489933 | | 6/1989 | |
| SU | 1638145 | | 3/1991 | |
| WO | 9934950 | | 7/1999 | |
| WO | 9958286 | | 11/1999 | |
| WO | 03019349 | | 1/2003 | |
| WO | 2004057554 | | 7/2004 | |
| WO | 2005102230 | | 11/2005 | |
| WO | 2005110658 | | 11/2005 | |
| WO | 2006004427 | | 1/2006 | |
| WO | 2006034571 | | 4/2006 | |
| WO | 2007009131 | | 1/2007 | |
| WO | 2007044135 | | 4/2007 | |
| WO | 2009022443 | | 2/2009 | |
| WO | 2009053829 | | 4/2009 | |
| WO | 2009060231 | | 5/2009 | |
| WO | 2009092944 | | 7/2009 | |
| WO | 2009146359 | | 12/2009 | |
| WO | 2010000003 | | 1/2010 | |
| WO | 2010020867 | | 2/2010 | |
| WO | 2010020870 | | 2/2010 | |
| WO | 2010111722 | | 10/2010 | |
| WO | 2011112493 | | 9/2011 | |
| WO | 2011150165 | | 12/2011 | |
| WO | 2012137060 | | 10/2012 | |
| WO | 2013023012 | | 2/2013 | |
| WO | 2013138831 | | 9/2013 | |
| WO | 2014007830 | | 1/2014 | |
| WO | 2014074296 | | 5/2014 | |
| WO | 2014140719 | | 9/2014 | |

OTHER PUBLICATIONS

"NJC Technology Displayed at ShipTech 2005", Welding Journal, vol. 84, No. 3, Mar. 2005, p. 54, https://app.aws.org/w/r/www/wj/2005/03/WJ_2005_03.pdf.

"Sheet Metal Conference XXII," Conference Program, American Welding Society, May 2006, Detroit.

"SOLDAMATIC: Augmented Training Technology for Welding," Seabery Augmented Training Technology, Seabery Soluciones, 2011.

"Virtual Reality Program to Train Welders for Shipbuilding", American Welding Society, Navy Joining Center, https://app.aws.org/wj/2004/04/052/.

"Virtual Reality Welder Training Initiatives: Virtual Welding Lab Pilot," Paul D. Camp Community College, Advanced Science & Automation Corporation, Northrop Grumman Newport News, Nov. 22, 2006, http://www.nsrp.org/6-Presentations/WD/103106_Virtual_Reality_Welder.pdf.

"Virtual Welding—A Low Cost Virtual Reality Welder Training System", Interim Status Report # 4, Technology Investment Agreement 2008-600, Feb. 18, 2009, http://www.nsrp.org/3-Key_Deliverables/FY08_Low-Cost_Virtual_Reality_Welder_Trainer/FY08_Low-Cost_Virtual_Reality_Welder_Trainer-Interim2.pdf.

"Virtual Welding: A Low Cost Virtual Reality Welder Training System," NSRP ASE, Feb. 19, 2009, http://www.nsrp.org/6-Presentations/WVD/020409_Virtual_Welding_Wilbur.pdf.

"Vision for Welding Industry," American Welding Society, Apr. 22, 1999, http://www.aws.org/library/doclib/vision.pdf.

"Welding in Defense Industry," American Welding Society conference schedule, 2004. https://app.aws.org/conferences/defense/live_index.html.

"Welding Technology Roadmap," prepared by Energetics, Inc., Columbia, MD, in cooperation with The American Welding Society and The Edison Welding Institute, Sep. 2000.

123arc.com—"Weld into the future"; 2000.

Advance Program of American Welding Society Programs and Events, Nov. 11-14, 2007, Chicago.

Aiteanu, Dorin, and Axel Graser, "Computer-Aided Manual Welding Using an Augmented Reality Supervisor," Sheet Metal Welding Conference XII, Livoinia, MI, May 9-12, 2006, pp. 1-14.

Aiteanu, Dorin, et al., "A Step Forward in Manual Welding: Demonstration of Augmented Reality Helmet," Institute of Automation, University of Bremen, Germany, 2003.

Aiteanu et al., Generation and Rendering of a Virtual Welding Seam in an Augmented Reality Training Envionment, Proceedings of the Sixth IASTED International Conference Visualization, Imaging, and Image Proceeding, Aug. 28-30, 2006, Palma de Mallorca, Spain ISBN Hardcapy: 0-88986-598-1 /CD: 0-88986-600-7 (8 pages).

American Welding Society Forms: typical Procedure Qualification Record and Welding Procedure Specification forms.

American Welding Society's Virtual Welding Trailer to Debut at FABTECH Careers in Welding Trailer Appeals to New Generation of Welders, Miami, Florida, Nov. 3, 2011.

ArcSentry Weld Monitoring System, Version 3, Users Manual, Native American Technologies, Golden, CO, Dec. 10, 1999.

ARVIKA Forum Vorstellung Projeckt PAARA, BMW Group Virtual Reality Center, Nuernberg, 2003.

Ascension Technology Corporation: Tracking 3D Worlds: http://ascension-tech.com/, Dec. 1996.

Barckhoff, J.R.; "Total Welding Managemet," American Welding Society, 2005.

Bender Shipbuilding and Repair, Co., "Virtual Welding—A Low Cost Virtual Reality Welder Training System", Technical Proposal, Jan. 23, 2008.

(56) References Cited

OTHER PUBLICATIONS

Byrd, Alex Preston, "Identifying the effects of human factors and training methods on a weld training program" (2014). Graduate Theses and Dissertations. Paper 13991.
Canadian Office Action Appln No. 2,959,374 dated Sep. 30, 2019.
Canadian Office Action Appln. No. 2,959,374 dated Dec. 11, 2017 (5 pages).
Central Welding Supply http://www.welders-direct.com/ Feb. 29, 2000.
Cho, Min Hyn, Numerical Simulation F Arc Welding Process and its Application Dissertation for Ohio State University by Min Hyun Cho, M.S. 2006: See Internet as this document is security protected) ohttps://etd.ohiolink.edu/ap:0:0:APPLICATION_PROCESS= DOWNLOAD_ETD_SUB_DOC_ACCNUM:::F1501_ ID:osu1155741113, attachment.
Choquet, Claude, ARC+ & ARC PC Welding Simulators: Teach Welders with Virtual Interactive 3D Technologies; Jul. 2010.
Choquet, Claude, ARC+: Today's Virtual Reality Solution for Welders, Jun. 1, 2008.
Cybernetics: Enhancing Human Performance found in the DTIC Review dated Mar. 2001, p. 186/19. See http://www.dtic.mil/dtic/ tr/fulltext/u2/a385219.pdf.
Echtler, Florian, Fabian Stuurm, Kay Kindermann, Gudrun Klinker, Joachim Stilla, Jorn Trilk, Hesam Najafi, "The Intelligent Welding Gun: Augmented Reality for Experimental Vehicle Construction," Virtual and Augmented Reality Applications in Manufacturing, Ong S.K and Nee A.Y.C., eds., Springer Verlag, 2003, pp. 1-27.
Evaluating Two Novel Tactile Feedback Devices, by Thomas Hulin, Phillipp Kremer, Robert Scheibe, Simon Schaetzle and Carsten Preusche presented at the 4th International Conference on Enactive Interfaces, Grenoble, France, Nov. 19 -22, 2007.
EWI, "EWI ArcCheck," marketing brochure, Columbus, Ohio, 1 page.
EWI, "EWI SkillBuilder," marketing brochure, Columbus, Ohio, 1 page.
Fast et al., Virtual Training for Welding, Proceedings of the Third IEEE and ACM International Symposium on Mixed and Augmented Reality (ISMAR 2004); 0-7695-2191-6/04; 2004.
Fast, Kenneth, Jerry Jones, and Valerie Rhoades; "Virtual Welding—A Low Cost Virtual Reality Welder Training System Phase II," National Shipbuilding Research Program (NSRP), NSRP ASE Technology Investment Agreement No. 2010-357, Feb. 29, 2012, http://www.nsrp.org/3-RA-Panel_Final_Reports/FY08_Virtual_ Welder_Final_Report.pdf.
Fite-Georgel, Pierre; "Is there a Reality in Industrial Augmented Reality?" 10th IEEE International Symposium on Mixed and Augmented Reality (ISMAR), 2011.
Fridenfalk et al., Design and Validation of a Universal 6D Seam Tracking System in Robotic Welding Based on Laser Scanning, Industrial Robotics: Programming, Simulation, and Application, ISBN 3-86611-286-6, pp. 702, ARS/pIV, Germany, Dec. 2006, edited by Kin Huat.
Fronius "The Ghost": http://www.fronius.com/cps/rde/xchg/SID- 3202EAB7-AE082518/fronius_interational/hs.xsl/79_15490_ENG_ HTML.htm; 2006.
Fronius International GmbH—Focus on Welding—Fronius Virtual Welding; http://www.fronius.com/cps/rde/xchg/SID-99869147- 0110E322/fronius_intenational/hs.xsl/79_15490_ENG_HML.htm; 2006.
Fronius Perfect Welding; 06,3082, EN v01 2010 aw05; Virtual Welding—The training method of the future; Feb. 20, 2012.
Ftp://www.hitl.washington.edu/pub/scivw/publications/IDS-pdf/ HAPTIC1.PDF, (University of Washington): Table 11, Tactile Feedback Actuator Technologies, p. 119, below the table is a. Based on Hasser (1995, 1996).
GAWDA—Welding & Gases Today Online GAWDA Media Blog; Will Games Turn Welding into a Virtual Market? Friday, Dec. 2, 2011; http://www.weldingandgasestoday.org/blogs/Devin-OToole/ index.php/ta.
Gundersen, O., et al. "The Use of an Integrated Multiple Neural Network Structure for Simultaneous Prediction of Weld Shape, Mechanical Properties, and Distortion in 6063-T6 and 6082-T6 Aluminum Assemblies", Mathematical Modelling of Weld Phenomena, vol. 5, Maney Publishing, 2001.
Haptic Feedback for Virtual Reality by Grigore C. Burdea dated 1996.
Hashimoto, Nobuyoshi et al., "Training System for Manual Arc Welding by Using Mixed Reality: Reduction of Position-Perception Error of Electrode Tip," Journal of the Japan Society for Precision Engineering, vol. 72, pp. 249-253, 2006.
Hemez, Francois M., Scott W. Doebling, "Uncertainty, Validation of Computer Models an the Myth of Numerical Predictability," Engineering Analysis Group (ESA-EA), Los Alamos National Laboratory, dated 2004.
Hillers, B, and Axel Graeser, "Direct welding arc observation withouth harsh flicker," FABTECH International and AWS Welding Show, 2007.
Hillers, B, and Axel Graeser, "Real time Arc-Welding Video Observation System," 62nd International Conference of IIW, Jul. 12-17, 2009, Singapore, 2009.
Hillers, B., et al.; "TEREBES: Welding Helmet with AR Capabilites," Institute of Automation, University of Bremen, and Institute of Industrial Engineering and Ergonomics, RWTH Aachen Universty, 2004.
Hillers, Bernd, Dorin Aiteanu, Axel Graser, "Augmented Reality— Helmet for the Manual Welding Process," Virtual and Augmented Reality Applications in Manufacturing, Institute of Automation, Universtity of Bremen, 2004.
Himperich, Frederick, "Applications in Augmented Reality in the Automotive Industry," Fachgebiet Augmented Reality, Department of Informatics, Jul. 4, 2007, p. 1-21.
http://www.123arc.com "Simulation and Certification"; 2000.
Image from Sim Welder.com—R-V's Welder Training Goes Virtual, www.rvii.com/PDF/simwelder.pdf; Jan. 2010.
IMPACT Spring 2012 vol. 12, No. 2, Undergraduate Research in Information Technology Engineering, University of Virginia School of Engineering & Applied Science; 2012.
Impact Welding: miscellaneous examples from current and archived website, trade shows, etc. See, e.g., http://www.impactwelding.com.
Integrated Microelectromechanical Gyroscopes; Journal of Aerospace Engineering, Apr. 2003 pp. 65-75 (p. 65) by Huikai Xie and Garry K. Fedder.
International Search Report and Written Opinion from PCT application No. PCT/US2017/046867 dated Nov. 13, 2017, 13 pages.
International Search Report for PCT application No. PCT/US2015/ 04234, dated Nov. 27, 2015, 14 pgs.
International Search Report for PCT application No. PCT/US2009/ 045436, dated Nov. 9, 2009, 3 pgs.
International Search Report for PCT application No. PCT/US2012/ 050059, dated Nov. 27, 2012, 16 pgs.
International Search Report for PCT application No. PCT/US2013/ 038371, dated Jul. 31, 2013, 8 pgs.
International Search Report for PCT application No. PCT/US2013/ 066037, dated Mar. 11, 2014, 10 pgs.
International Search Report for PCT application No. PCT/US2013/ 066040, dated Mar. 11, 2014, 12 pgs.
International Search Report for PCT application No. PCT/US2014/ 018107, dated Jun. 2, 2014, 3 pgs.
International Search Report for PCT application No. PCT/US2014/ 018109, dated Jun. 2, 2014, 4 pgs.
International Search Report for PCT application No. PCT/US2014/ 018113, dated Jun. 2, 2014, 3pgs.
International Search Report for PCT application No. PCT/US2014/ 018114, dated Jun. 2, 2014, 4 pgs.
International Search Report for PCT application No. PCT/US2014/ 065498, dated May 11, 2015, 13 pgs.
International Search Report for PCT application No. PCT/US2014/ 065506, dated Jun. 26, 2015, 16 pgs.
International Search Report for PCT application No. PCT/US2014/ 065512, dated Jun. 8, 2015, 17 pgs.
International Search Report for PCT application No. PCT/US2014/ 065525, dated Jul. 23, 2015, 16 pgs.
International Search Report for PCT application No. PCT/US2014/ 067951, dated Feb. 24, 2015, 10 pgs.

(56) References Cited

OTHER PUBLICATIONS

International Search Report for PCT application No. PCT/US2015/037410, dated Nov. 6, 2015, 10 pgs.
International Search Report for PCT application No. PCT/US2015/037439, dated Nov. 3, 2015, 12 pgs.
International Search Report for PCT application No. PCT/US2015/037440, dated Nov. 3, 2015, 12 pgs.
International Search Report for PCT application No. PCT/US2015/039680, dated Sep. 23, 2015, 12 pgs.
International Search Report from PCT application No. PCT/US2014/018103, dated Jun. 30, 2014, 13 pgs.
International Search Report from PCT application No. PCT/US2015/028939, dated Oct. 14, 2015, 13 pgs.
International Search Report from PCT application No. PCT/US2015/041462, dated Dec. 4, 2015, 14 pgs.
International Search Report from PCT application No. PCT/US2015/043370, dated Dec. 4, 2015, 12 pgs.
International Search Report from PCT application No. PCT/US2015/058563, dated Jan. 29, 2016, 13 pgs.
International Search Report from PCT application No. PCT/US2015/058567, dated May 6, 2016, 15 pgs.
International Search Report from PCT application No. PCT/US2015/058569, dated Feb. 10, 2016, 12 pgs.
International Search Report from PCT application No. PCT/US2015/058660, dated Feb. 2, 2016, 14 pgs.
International Search Report from PCT application No. PCT/US2015/058664, dated Apr. 25, 2016, 17 pgs.
International Search Report from PCT application No. PCT/US2015/058666, dated Feb. 1, 2016, 11 pgs.
International Search Report from PCT application No. PCT/US2015/058667, dated Feb. 5, 2016, 14 pgs.
International Search Report from PCT application No. PCT/US2016/023612, dated Jul. 18, 2016, 11 pgs.
Jo et al., Visualization of Virtual Weld Beads, VRST 2009, Kyoto, Japan, Nov. 18-20, 2009; Electronics and Telecommunications Research Institute (ETRI) ACM 978-1 60558-869-8/09/0011.
Kevin Dixon, et al., 'Gesture-based Programming for Robotic Arc Welding', Carnegie Mellon University, dated Dec. 6, 2002 (24 pages).
Kiwinakiful; Holographic TV coming 2012 (as seen on BBC); http://www.youtube.com/watch?v=Ux6aD6vE9sk&feature=related, Jul. 2, 2011.
Kobayashi, Kazuhiko et al., "Modified Training System for Manual Arc Welding by Using Mixed Reality and Investigation of Its Effectiveness," Journal of the Japan Society for Precision Engineering, vol. 70, pp. 941-945, 2004.
Kobayashi, Kazuhiko et al., "Simulator of Manual Metal Arc Welding with Haptic Display," Chiba University, ICAT 2001, Dec. 2001.
Kobayashi, Kazuhiko et al., "Skill Training System of Manual Arc Welding by Means of Face-Shield HMD and Virtual Electrode," Chiba University, Japan, R. Nakatsu et al. (eds.), Entertainment Computing, Springer Science+Business Media, New York, 2003.
Kooima, Robert; Kinect +3D TV=Virtual Reality; http://www.youtube.com/watch?v=2MX1RinEXUM&feature=related, Feb. 26, 2011.
Leap Motion; https://www.leapmotion.com/, May 2012.
Lincoln Electric VRTEX Virtual Reality Arc Welding Trainer; http://www.lincolnelectric.com/en-us/equipment/training-equipment/pages/vrtex360.aspx; 1999.
Maccormick, John; How does the Kinect work ?; http://users.dickinson.edu/~jmac/selected-talks/kinect.pdf, Dec. 1, 2011.
NAMeS Users Guide, N A Tech Neural Applications, Copyright 1997, 1998, 1999, 2000 Golden, CO (123 pages).
NAMeS, Native American Technologies Weld Measuring Software, Users Guide, 2000.
National Science Foundation—Where Discoveries Begin—Science and Engineering's Most Powerful Statements Are Not Made From Words Alone—Entry Details for NSF International Science & Engineering Visualization Challenge, Public Voting ended on Mar. 9, 2012; Velu the welder by Muralitharan Vengadasalam—Sep. 30, 2011; https://nsf-scivis.skild.com/skild2/NationalScienceFoundation/viewEntryDetail.action?pid.
Native American Technologies, "ArcDirector Weld Controller" web page, http://web.archive.org/web/20020608125127/http://www.natech-inc.com/arcdirector/index.html, published Jun. 8, 2002.
Native American Technologies, "ArcSentry Weld Quality Monitoring System" web page, http://web.archive.org/web/20020608124903/http://www.natech-inc.com/arcsentry1/index.html, published Jun. 8, 2002.
Native American Technologies, "P/NA.3 Process Modelling and Optimization" web pages, http://web.archive.org/web/20020608125619/http://www.natech-inc.com/pna3/index.html, published Jun. 8, 2002.
Native American Technologies, "Process Improvement Products" web page, http://web.archive.org/web/20020608050736/http://www.natech-inc.com/products.html, published Jun. 8, 2002.
Natural Point, Trackir; http://www.naturalpoint.com/trackir/, Dec. 2003.
NZ Manufacturer Game promotes welding trade careers; http://nzmanufacturer.co.nz/2011/11/gme-promotes-welding-trade-careers/ . . . Compentenz Industry Training; www.competenz.org.nz; Game promotes welding trade careers, Nov. 7, 2011.
OptiTrack: Motion Capture Systems: http://www.naturalpoint.com/optitrack/, Mar. 2005.
Penrod, Matt; "New Welder Training Tools," EWI PowerPoint presentation, 2008.
PhaseSpace: Optical Motion Capture: http://phasespace.com/, 2009.
Playstation; Move Motion Controller: http://us.playstation.com/ps3/playstation-move/, Mar. 2010.
Polhemus: Innovation in Motion: http://polhemus.com/?page=researchandtechnology, 1992.
Porter et al, EWI-CRP Summary Report SR0512, Jul. 2005—Virtual Reality Welder Training.
Porter, Nancy C., Edison Welding Institute; J. Allan Cote, General Dynamics Electrict Boat; Timothy D. Gifford, VRSim; and Wim Lam, FCS Controls—Virtual Reality Welder Training—Project No. S1051 Navy Man Tech Program; Project Review for Ship Tech 2005,—Mar. 1, 2005, Biloxi, MS, http://www.nsrp.org/6-Presentations/WD/Virtual_Welder.pdf.
Porter, Nancy C., Edison Welding Institute; J.Allan Cote, General Dynamics Electric Boat; Timoty D. Gifford, VRSim; and Wim Lam, FCS Controls—Virtual Reality Welder Training—Session 5; Joining Technologies for Naval Applications; 2007.
Quebec International, May 28, 2008 'Video Game' Technology to Fill Growing Need; http://www.mri.gouv.qc.ca/portail/_scripts/actualities/viewnew.sap?NewID=5516.
Ryu, Jonghyun, Jaehoon Jung, Seojoon Kim, and Seungmoon Choi, "Perceptually Transparent Vibration Rendering Using a Vibration Motor for Haptic Interaction," 16 IEEE International Conference on Robot & Human Interactive Communication, Jeju, Korea, Aug. 26-29, 2007.
Sandor, Christian, Gudrun Klinker, "PAARTI: Development of an Intelligent Welding Gun for BMW," PIA 2003, Tokyo, Japan, Technical University of Munich Department of Informatics, Oct. 7, 2003.
Sandor, Christian, Gudrun Klinker; "Lessons Learned in Designing Ubiquitous Augmented Reality User Interfaces," Emerging Technologies of Augmented Reality Interfaces, Eds. Haller, M, Billinghurst, M., and Thomas, B., Idea Group Inc., 2006.
ShotOfFuel; Wii Head Tracking for 3D, http://www.youtube.com/watch?v=1x5ffF-0Wr4, Mar. 19, 2008.
Sternowski, Andreas; "Handheld Welding Torch with Position Detection," Patente Fonds, Patent Portfolio, Sep. 21, 2011.
Stone, R. T., K. Watts, and P. Zhong, "Virtual Reality Integrated Welder Training, Welding Research," Welding Journal, vol. 90, Jul. 2011, p. 136-s-141-s, https://app.aws.org/wj/supplement/wj201107_s136.pdf.
TCS News & Events: Press Release: TCS wins the "People Choice" award from National Science Foundation, USA, pp. 1-6; Press Release May 21, 2012; http://www.tsc.com/news_events/press_releases/Pages/TCS_People_Choice_award_Natio.
TeachWELD: Welding Simulator/Hands-On Learning for Welding: http://realityworks.com/products/teachweld-welding-simulator; 2012.

(56) References Cited

OTHER PUBLICATIONS

TEREBES; miscellaneous examples from http://www.terebes.uni-bremen.de.
The Rutgers Master II—New Design Force-Feedback Glove by Mourad Bouzit, Member, IEEE, Grigore Burdea, Senior Member, IEEE, George Popescu, Member, IEEE, and Rares Bolan, Student Member, found in IEEE/ASME Transactions on Mechatronics, vol. 7, No. 2, Jun. 2002.
Thefabricator.com—Arc Welding Article; Heston, Tim, Virtual welding—Training in a virtual environment gives welding students a leg up—Mar. 11, 2008.
Tschirner, Petra, Hillers, Bernd, and Graeser, Axel; "A Concept for the Application of Augmented Reality in Manual Gas Metal Arc Welding," Proceedings of the International Symposium on Mixed and Augmented Reality, 2002.
Vicon: Motion Capture Systems: http://vicon.com/, Dec. 1998.
Virtual Reality Training Manual Module 1—Training Overview—A Guide for Gas Metal Arc Welding—EWI 2006.
VRTEX 360 Operator's Manual, Lincoln Electric, Oct. 2012.
VRTEX 360, Lincoln Electric, Dec. 2009.
Weld Training Solutions, REALWELD, The Lincoln Electric Company, Jul. 2015.
Welding Journal, American Welding Society, Nov. 2007, https://app.aws.org/wj/2007/11/WJ_2007_11.pdf.
White, S., et al., "Low-Cost Simulated MIG Welding for Advancement in Technical Training," Virtual Reality, 15, 1, 69-81, Mar. 2011. ISSN:13594338 [Retrieved from EBSCOhost, Jun. 15, 2015].
Canadian Office Action Appln. No. 2,958,203 dated Oct. 4, 2019 (5 pages).
Canadian Office Action Appln. No. 2,958,203 dated Jun. 10, 2021.
Native American Technologies, "Official NAMeS Web Site" web page, http://web.archive.org/web/20020903210256/http://www.natech-inc.com/names/names.html, published Sep. 3, 2002.

* cited by examiner

SENSOR-BASED POWER CONTROLS FOR A WELDING SYSTEM

BACKGROUND

The invention relates generally to welding systems, and, more particularly, to sensing systems for controlling power supplies or accessories of a welding system using motion sensors.

Welding is a process that has become ubiquitous in various industries for a variety of types of applications. For example, welding is often performed in applications such as shipbuilding, aircraft repair, construction, and so forth. The welding systems often include power sources that may generate power for consumption during the welding process. However, these power sources may generate power even when unneeded due to inactivity of the welding torch. Furthermore, if the power sources are inactive or producing reduced power until a demand event (e.g., a trigger is pressed), there may be a period of time during which power is desired but unavailable.

BRIEF DESCRIPTION

In a first embodiment, a welding system includes a power source and a torch motion sensing system associated with a welding torch and configured to sense welding torch orientations or movements. The welding system also includes a processing system communicatively coupled to the torch motion sensing system. The processing system is configured to determine movement of the welding torch prior to a welding demand from the welding torch, and to send an indication to the power source to provide power at a generation level sufficient to operate the welding torch.

In another embodiment, a method includes sensing an initial orientation of a welding torch, via a torch motion sensing system and sensing subsequent orientations of the welding torch, via the torch motion sensing system. The method also includes activating a power source associated with the welding torch if the power source is turned off and the subsequent orientations differ from the initial orientation. Furthermore, the method includes activating a higher power state for the power source if the power source is in a low-power state and the subsequent orientations differ from the initial orientation.

In a further embodiment, a retro-fit kit configured to couple to a welding torch includes a torch motion sensing system configured to determine orientations or movements of the welding torch. Furthermore, the retro-fit kit includes a processor configured to send instructions to a power supply for the welding torch to provide power in response to movements of the welding torch or changes in orientations of the welding torch.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail below, provided herein are systems and methods for using motion (e.g., inertial) sensors in a welding torch to determine likelihood of power demand prior to actual demand to reduce delays in power availability and/or waste of generated power. By determining that a welding torch is being moved, the welding system may determine demand is likely imminent and that a higher level power generation state should be initiated even before explicit requests (e.g., pressing a trigger on the torch). The generation of power when the welding torch determines that the demand is likely imminent allows a power source to ramp up power earlier, thereby reducing or eliminating a deficit in power available at the time of initial demand.

Figure 1:
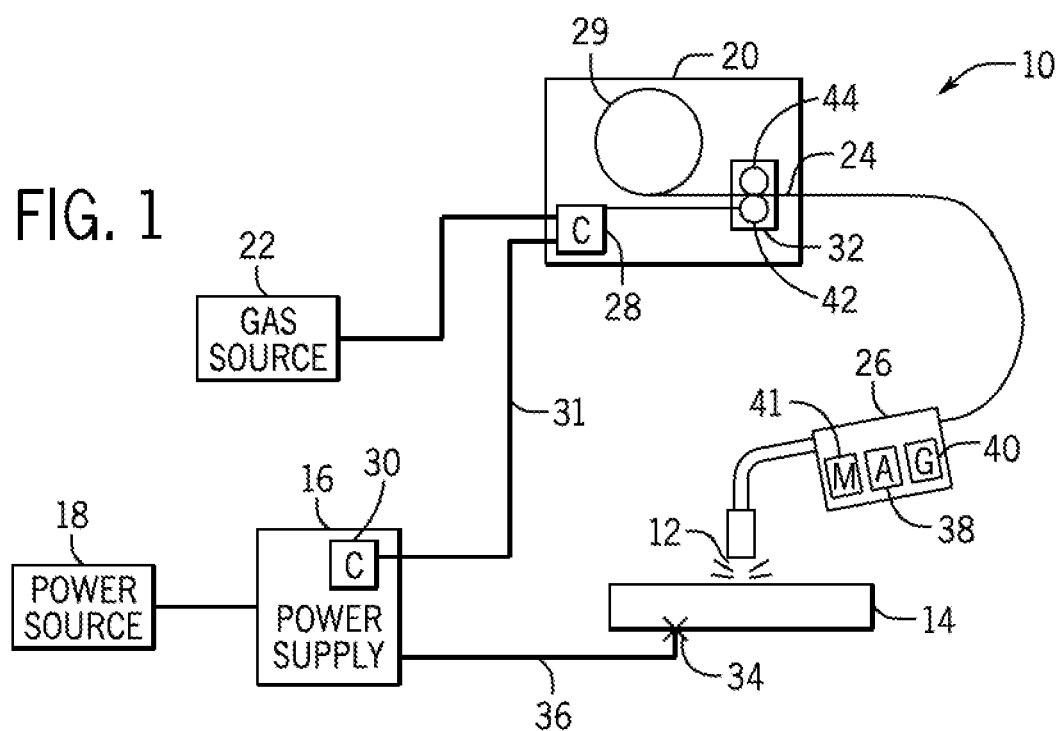
FIG. 1 is a block diagram of an embodiment of a welding system utilizing a power supply and a welding torch with motion sensors.

Turning now to the figures, FIG. 1 is a block diagram of an embodiment of a welding system 10 in accordance with the present techniques. The welding system 10 is designed to produce a welding arc 12 with a workpiece 14 (e.g., pipe). The welding arc 12 may be generated by any type of welding system or process, and may be oriented in any desired manner. For example, such welding systems may include gas metal arc welding (GMAW) systems, and may utilize various programmed waveforms and settings. The welding system 10 includes a power supply 16 (e.g., engine-driven generator in some embodiments) that will typically be coupled to a power source 18, such as a power grid, an engine, or a combination thereof (e.g., hybrid power). Other power sources may, of course, be utilized including generators and so forth. In the illustrated embodiment, a wire feeder 20 is coupled to a gas source 22 and the power source 18, and supplies welding wire 24 to a welding torch 26. The welding torch 26 is configured to generate the welding arc 12 between the welding torch 26 and the workpiece 14. The welding wire 24 is fed through the welding torch 26 to the welding arc 12, melted by the welding arc 12, and deposited on the workpiece 14.

The wire feeder 20 will typically include wire feeder control circuitry 28, which regulates the feed of the welding wire 24 from a spool 29 and commands the output of the power supply 16, among other things. Similarly, the power supply 16 may include power supply control circuitry 30 for controlling certain welding parameters and arc-starting parameters. In certain embodiments, the wire feeder control circuitry 28 or the power supply control circuitry 30 may be include software, hardware, or a combination thereof. For example, in certain embodiments, the wire feeder control circuitry 28 and/or the power supply control circuitry 30 may include a processor and memory configured to store instructions to be executed by the processor. In some embodiments, the wire feeder control circuitry 28 may communicate with the power supply control circuitry 30 through a weld cable 31 that is also used to provide power to the wire feeder 20. The spool 29 of the wire feeder 20 will contain a length of welding wire 24 that is consumed during the welding operation. The welding wire 24 is advanced by a wire drive assembly 32, typically through the use of an electric motor under control of the control circuitry 28. In addition, the workpiece 14 is coupled to the power supply 16 by a clamp 34 connected to a work cable 36 to complete an electrical circuit when the welding arc 12 is established between the welding torch 26 and the workpiece 14.

Placement of the welding torch 26 at a location proximate to the workpiece 14 allows electrical current, which is provided by the power supply 16 and routed to the welding torch 26, to arc from the welding torch 26 to the workpiece 14. As described above, this arcing completes an electrical circuit that includes the power supply 16, the welding torch 26, the workpiece 14, and the work cable 36. Particularly, in operation, electrical current passes from the power supply 16, to the welding torch 26, to the workpiece 14, which is typically connected back to the power supply 16 via the work cable 36. The arc generates a relatively large amount of heat that causes part of the workpiece 14 and the filler metal of the welding wire 24 to transition to a molten state that fuses the materials, forming the weld.

In certain embodiments, to shield the weld area from being oxidized or contaminated during welding, to enhance arc performance, and to improve the resulting weld, the welding system 10 may also feed an inert shielding gas to the welding torch 26 from the gas source 22. It is worth noting, however, that a variety of shielding materials for protecting the weld location may be employed in addition to, or in place of, the inert shielding gas, including active gases and particulate solids. Moreover, in other welding processes, such gases may not be used, while the techniques disclosed herein are equally applicable.

Although FIG. 1 illustrates a GMAW system, the presently disclosed techniques may be similarly applied across other types of welding systems, including gas tungsten arc welding (GTAW) systems and shielded metal arc welding (SMAW) systems, among others. Accordingly, embodiments of the sensor-based power supply controls may be utilized with welding systems that include the wire feeder 20 and gas source 22 or with systems that do not include a wire feeder 20 and/or a gas source 22 (e.g., embodiments where the welding torch 26 is directly coupled to the power supply 16), depending on implementation-specific considerations.

Presently disclosed embodiments are directed to sensor-based control of the power supply 16. In some embodiments, the wire feeder control circuitry 28 and/or the power supply control circuitry 30 may control the power supply 16 based on inertial data derived using at least an accelerometer 38, gyroscope sensor 40, and/or magnetometer 41 (collectively referred to as the sensors) located in, on, or associated with the welding torch 26. For example, in some embodiments, the sensors may be located in a retro-fit kit that may be mounted to the welding torch 26. Moreover, in some embodiments, the circuitry 30 may individually control the welding power supplied by the power supply 16 based at least in part on the sensor feedback. In certain embodiments, the circuitry 28 may individually adjust wire feed speed based at least in part on the sensor feedback. In other embodiments, and either of circuitries (28 or 30) may perform their control and send a control signal to the other so that the other can perform their control in yet other embodiments.

In certain embodiments, the accelerometer 38 may include a single triaxial accelerometer capable of measuring dynamic motion, such as weld weaving. In other embodiments, the accelerometer 38 may include one or more orientation sensors (e.g., accelerometers) to determine a change of welding torch 26 orientation in one or more dimensions. For example, a two-dimensional position may be calculated with respect to a plane parallel to a direction of gravity based on two accelerometers. Using the accelerometer 38, the power supply control circuitry 30 and/or the wire feeder control circuitry 28 may determine that the welding torch 26 is in an active state (e.g., upright position) or an inactive state. For example, the welding torch 26 may be deemed inactive when remaining substantially motionless for a period of time in a position indicating idleness, such as lying on its side, upside down, or lying with the welding torch 26 facing downward.

In some embodiments, the gyroscope sensor 40 may include one or more gyroscope sensors, such as a single triaxial gyroscope sensor. The power supply control circuitry 30 and/or the wire feeder control circuitry 28 may use the gyroscope sensor 40 to supplement data from the accelerometer 38 to measure low value movements, such as oscillatory motions used in certain welding processes (e.g., TIG).

In certain embodiments, the magnetometer 41 may include one or more gyroscope sensors, such as a single triaxial magnetometer. The power supply control circuitry 30 and/or the wire feeder control circuitry 28 may use the magnetometer 41 to determine changes in magnetic fields such as movement of the welding torch 26 or other objects in the weld area.

Figure 2:
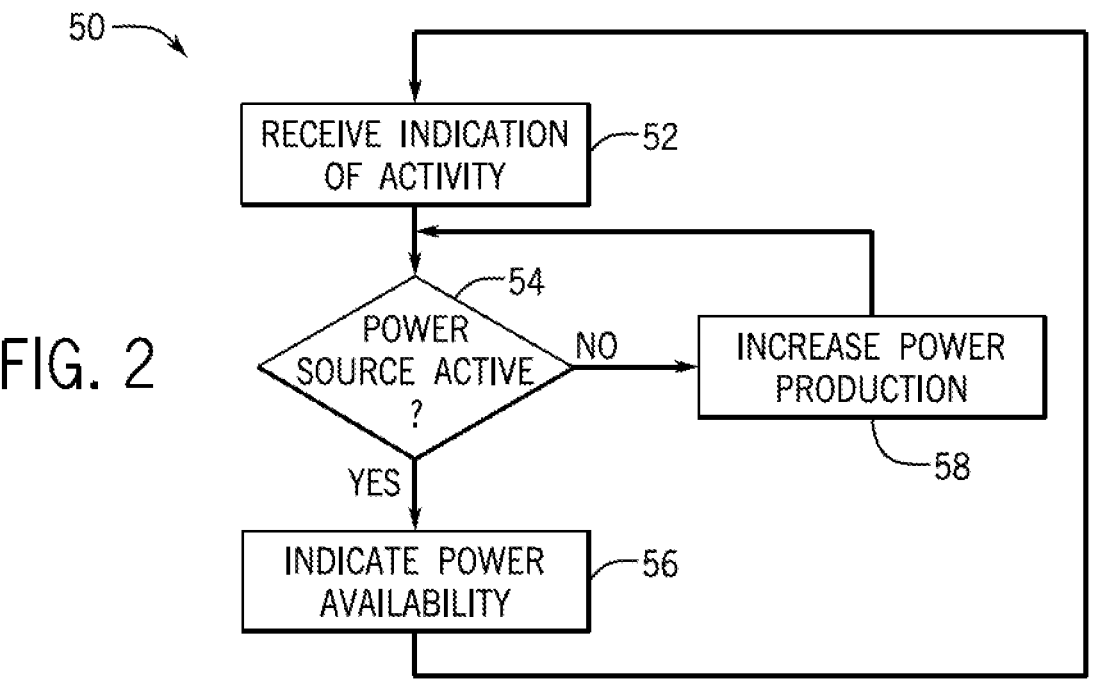
FIG. 2 is a flowchart of an embodiment of a power control process that may be used by the welding system of FIG. 1.

Using data from one or more of the sensors, the power supply control circuitry 30 and/or the wire feeder control circuitry 28 may control the power supply 16 to ensure that sufficient power is produced when an operator begins to use the welding torch 26. In certain embodiments, the power supply control circuitry 30 and/or the wire feeder control circuitry 28 may control the power supply 16 by implementing a power control process 50, as illustrated in FIG. 2. In some embodiments, the power supply control circuitry 30 and/or the wire feeder control circuitry 28 may implement the process 50 via instructions stored in a non-transitory, computer-readable medium (e.g., memory) and executed by a processor. The power supply control circuitry 30 and/or the wire feeder control circuitry 28 receive data indicative of activity (block 52). In some embodiments, the data indicative of activity may be received from the welding torch 26 as data indicating that the torch 26 has moved or that some other object (e.g., via magnetometer 41) has moved within the weld area. As will be discussed below, the data may be transmitted to the power supply control circuitry 30 and/or the wire feeder control circuitry 28 via a transmitter located within the torch 26.

Upon receipt of these indicia of activity, the power supply control circuitry 30 and/or the wire feeder control circuitry 28 determines that the torch 26 is likely to be used (e.g., that a depression of a trigger of the torch 26, to initiate a welding arc, may be imminent). Accordingly, the power supply control circuitry 30 and/or the wire feeder control circuitry 28 determine whether power should be increased by determining whether the power source is active and producing sufficient power (block 54). For example, the power supply control circuitry 30 and/or the wire feeder control circuitry 28 determines whether an engine is producing sufficient energy or whether AC line power is sufficient for welding. Since the power supply 16 may be beyond vision or hearing of the operator, in some embodiments, if the power supply 16 is active and producing desired energy, the welding system 10 may indicate that sufficient power is available (block 56). As discussed below, available power may be indicated via haptic, visual, or audio feedback through the welding torch 26, a welding helmet, or external feedback device to an operator indicating that the welding system 10 is ready to provide a desired level of power. However, if the power supply 16 is not active or not ready to provide a desired power level (e.g., the power supply 16 is idling), the power supply control circuitry 30 and/or the wire feeder control circuitry 28 may cause the power supply 16 to turn on or increase power consumption (block 58) from input line power, or power production from engine. Once sufficient power consumption is achieved, available power may be indicated to the operator via haptic, visual, or audio feedback.

Moreover, in some situations, it may be desirable to reduce power during periods of inactivity. For example, if the power supply 16 includes an engine, the power supply control circuitry 30 and/or the wire feeder control circuitry 28 may enable the engine to idle or shutoff when receiving indicia of inactivity, thereby reducing power production based on a sensed lack of demand. One typical form of idle state is disconnecting the input power to the main power converter for output but allows control power connected for communications to the motion sensors and reconnect the main power. One typical power consumption of the main power converter is the magnetizing current of the main transformer. By eliminating power consumption of the main transformer, less power is wasted while the welding torch 26 is inactive. Furthermore, when the power supply 16 includes an engine, the engine can be completely shut off when the welding or gouging tool is not in use. The power supply controls can be powered by battery to communicate with the motion sensors and start the engine as the operator picks up the torch ready for welding. An alternative is to run the engine at low speed for controls only but not sufficient to provide welding power but increase to high speed when the torch is picked up or moved by operator after periods of no movement. Often for stick welding, it needs an initial high power for the first few hundreds of milliseconds for arc ignition so the motion sensor can trigger the engine to go to high speed for arc start, then ramp down to lower speed for the remainder of the weld. Moreover, increased energy consumption using an engine may involve increased fuel consumption, engine wear, and noise production, thereby reducing energy consumption may reduce fuel consumption, engine wear, noise production, and so forth.

It is also possible to tag different motion sensors with power levels for specific tools. For example, for arc gouging uses much higher power than arc welding. It is possible to that the movement of gouging tool will trigger a higher engine speed sufficient for gouging, and the movement of the welding tool will trigger a lower engine speed sufficient for welding when the engine is waken from sleeping state (shut off).

Figure 3:
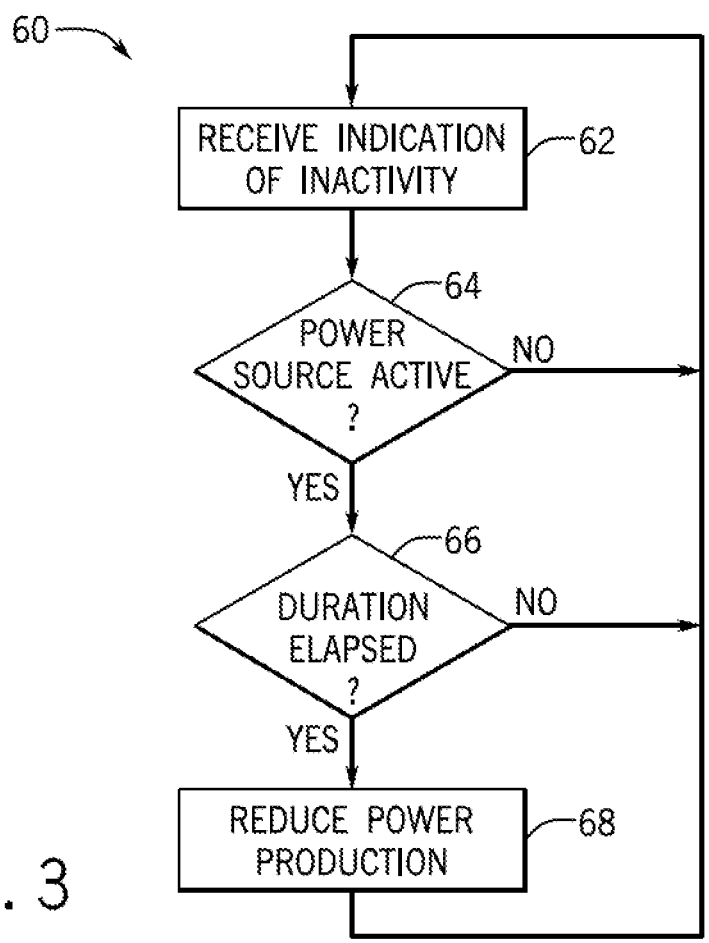
FIG. 3 is a flowchart of an embodiment of a power control process that may be used by the welding system of FIG. 1.

Accordingly, FIG. 3 illustrates a power control process 60 that may be implemented by the power supply control circuitry 30 and/or the wire feeder control circuitry 28. The power supply control circuitry 30 and/or the wire feeder control circuitry 28 may receive an indication of inactivity (block 62). For example, if the power supply control circuitry 30 and/or the wire feeder control circuitry 28 determines that the welding torch 26 has remained substantially motionless or in a position indicating idleness, such as laying on its side, upside down, or laying with the welding torch 26 facing downward, for a given period of time. If the power supply 16 is active or producing power (block 64), the power supply control circuitry 30 and/or the wire feeder control circuitry 28 determines if a power reduction duration has elapsed (block 66). In other words, in some embodiments, the power supply control circuitry 30 and/or the wire feeder control circuitry 28 may allow some amount of idleness (e.g., less than a minute) without controlling power production. In some embodiments, more than one duration may be used. For example, in some embodiments, the power supply control circuitry 30 and/or the wire feeder control circuitry 28 may cause an engine to idle after a first threshold (e.g., 5 minutes) of inactivity is surpassed and to turn off when a second threshold (e.g., 10 minutes) is surpassed.

Upon determination that the welding torch 26 is inactive for some period and the power supply 16 is producing unused power, the power supply control circuitry 30 and/or the wire feeder control circuitry 28 reduces power production (block 68). Otherwise, the power supply control circuitry 30 and/or the wire feeder control circuitry 28 do not adjust power production. As discussed above, in some embodiments, the power supply control circuitry 30 and/or the wire feeder control circuitry 28 may reduce power in one or more steps. For example, the power supply control circuitry 30 and/or the wire feeder control circuitry 28 may reduce a power production level at various intervals of inactivity and shut off power production after another duration of inactivity.

Figure 4:
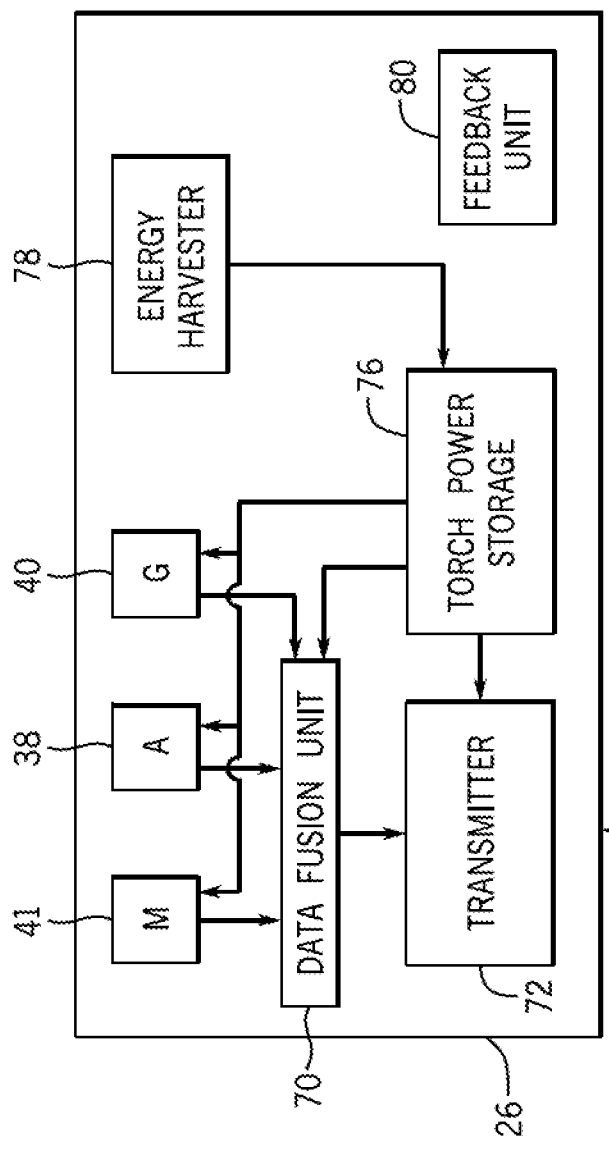
FIG. 4 is a block diagram of an embodiment of the power supply and welding torch of FIG. 1.

FIG. 4 illustrates a block diagram view of an embodiment of a power supply 16 and welding torch 26 that may be used to implement the power control processes 50 and 60 discussed above. The welding torch 26 may include at least one of the magnetometer 41, the accelerometer 38, and the gyroscope 40. In some embodiments having one or more of the sensors, a data fusion unit 70 may receive the measurements from the magnetometer 41, the accelerometer 38, and the gyroscope 40 and may fuse the data for transmission via a transmitter 72. For example, a magnetometer 41 may detect changes in a magnetic field while the accelerometer 38 detects movement. The data fusion unit 70 may fuse the data by using data from both sensors to an accurate model of welding torch movement. In some embodiments, the data fusion unit 70 may fuse data from sensors external to the welding torch 26 (e.g., a light sensor in the weld area) with the internal sensors. In other embodiments, only one of the sensors may be relied upon at a time without fusing the data or having a data fusion unit 70. In some embodiments, the data from the sensors may be transmitted by the transmitter 72 without first being fused such that the power supply control circuitry 30 and/or the wire feeder control circuitry 28 may receive the data separately and analyze the information. In some embodiments, the data fusion unit 70 may include hardware, software, or some combination thereof (e.g., processor and memory storing instructions).

The transmitter 72 used to transmit information from the welding torch 26 to the power supply control circuitry 30 and/or the wire feeder control circuitry 28 may include wired or wireless connections. For example, in the illustrated embodiment, the transmitter 72 transmits sensor data to a receiver 74 of the power supply control circuitry 30 using the weld cable 31 that is used to power the welding torch 26. In certain embodiments, the wire feeder 20 may also include a transmitter, a receiver, or a transceiver. In some embodiments, the transmitter 72 may transmit sensor data to the receiver 74 using a data line separate from the weld cable 31. In some embodiments, the transmitter 72 and the receiver 74 may include wireless communication radios configured to transmit and receive data wirelessly. For example, in some embodiments, the transmitter 72 and the receiver 74 may include transceivers configured to communicate via 802.11 (WiFi), 802.15.4, ZigBee®, 802.15.1, Bluetooth, Cellular Machine to Machine (M2M) technologies.

In some embodiments, the welding torch 26 includes a torch power storage 76 (e.g., chemical batteries or capacitors) that may be used to provide power for operating the sensors, the data fusion unit 70, and/or the transmitter 72. In some embodiments, the sensors, the data fusion unit 70, and/or the transmitter 72 may be at least partially powered by the power supply 16 when the power supply 16 is producing power. However, in certain embodiments, the welding torch 26 may also include an energy harvester 78 that may be used to replenish the torch power storage 76 during operation of the welding torch 26. The energy harvester 78 scavenges power (e.g., electricity, heat, magnetic fields, etc.) from the immediate environment to power the sensors. For example, an inductive unit of the energy harvester 78 may extract a small amount of energy from the fluctuating current in the weld cable 31 to charge the torch power storage 76.

In some embodiments, a feedback unit 80 may be used to alert the operator that a level of power is being produced to enable the operator to determine whether sufficient power is available for using the welding torch 26. In some embodiments, the feedback unit 80 may include one or more LEDs, one or more sound emitting units (e.g., speakers), one or more haptic feedback units, dials, meters, other units suitable for indicating power availability, or some combination thereof. The present embodiment illustrates the feedback unit 80 as part of the welding torch 26. In some embodiments, the feedback unit 80 may be located within a welding helmet, separate from the operator in the weld area, on the welding torch 26, or some combination thereof.

Figure 5:
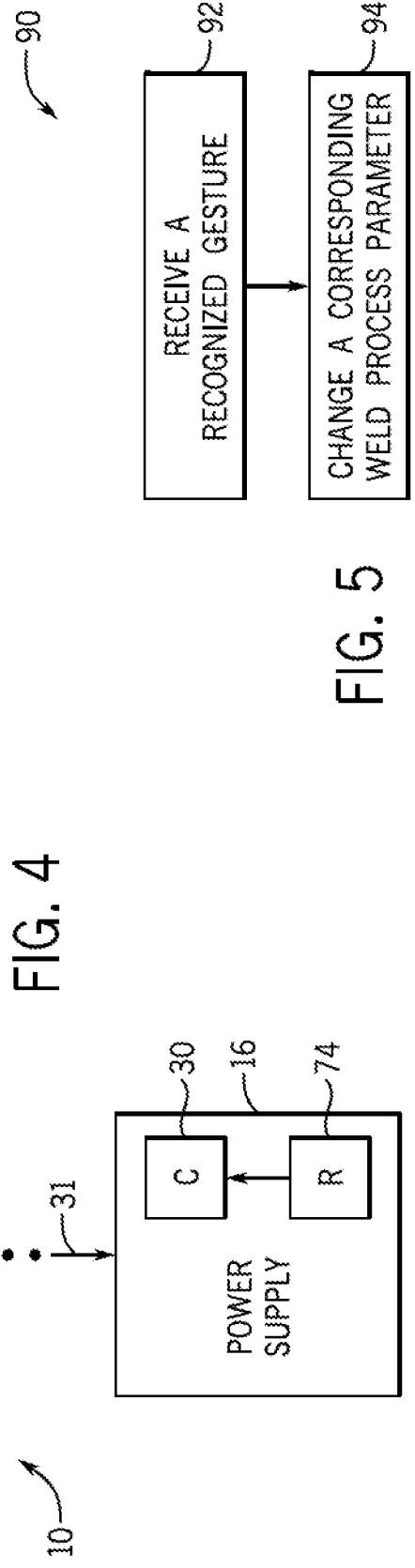
FIG. 5 is a flowchart of an embodiment of a gesture control process that may be used to control the welding system of FIG. 1.

In some embodiments, the sensors may be used to determine more than presence of motion. In some embodiments, the sensors may be used to determine various gestures to a change in weld process. For example, FIG. 5 illustrates a flow chart of a gesture control process 90 that may be used to control the welding system 10. The welding system 10 receives a recognized gesture (block 92). In some embodiments, various gestures may be preprogrammed the power supply control circuitry 30 and/or the wire feeder control circuitry 28 or later learned using the welding torch 26. For example, the gestures may include a horizontal swipe (e.g., left or right), a vertical swipe (e.g., up or down), a circular motion (e.g., clockwise or counterclockwise loop), a twist (e.g., clockwise or counterclockwise rotation of the torch 26), or other gestures that may be recognized by the sensors. In other words, the raw data generated by the sensors may be analyzed to determine when certain gestures are being performed by the operator using the welding torch 26. In some embodiments, the gestures may be analyzed by a preprocessor (e.g., the data fusion unit 70, in certain embodiments) prior to communication to the power supply control circuitry 30 and/or the wire feeder control circuitry 28. In other words, in such embodiments, raw data may be analyzed by the data fusion unit 70, and the data fusion unit 70 transmits which gestures are recognized to the power supply control circuitry 30 and/or the wire feeder control circuitry 28. In other embodiments, the power supply control circuitry 30 and/or the wire feeder control circuitry 28 may analyze raw data from the sensors to recognize the gestures.

Upon receipt of a recognized gesture, the power supply control circuitry 30 and/or the wire feeder control circuitry 28 changes a corresponding weld process parameter (block 94). For example, if a rapid left or right swipe is recognized, the power supply control circuitry 30 and/or the wire feeder control circuitry 28 may decrease or increase a corresponding welding parameter, such as voltage for MIG welding or current for shielded metal arc welding (SMAW) and tungsten inert gas (TIG) welding. Additionally or alternative, the welding parameter may include a current for carbon arc gouging (CAG) process, plasma cutting, or welding process or a current for tools powered off auxiliary output of the power source, such as a grinder or pump. In some embodiments, a recognized gesture may progress the power supply through a number of states.

Additionally or alternatively, if a clockwise circular motion or a clockwise twist is recognized, an engine of the power supply 16 may be turned on while corresponding clockwise motions may turn off the power supply engine. Such gestures and associated actions are merely exemplary, and not intended to be limiting. Other gestures and resulting actions may also be used.

Figure 6:
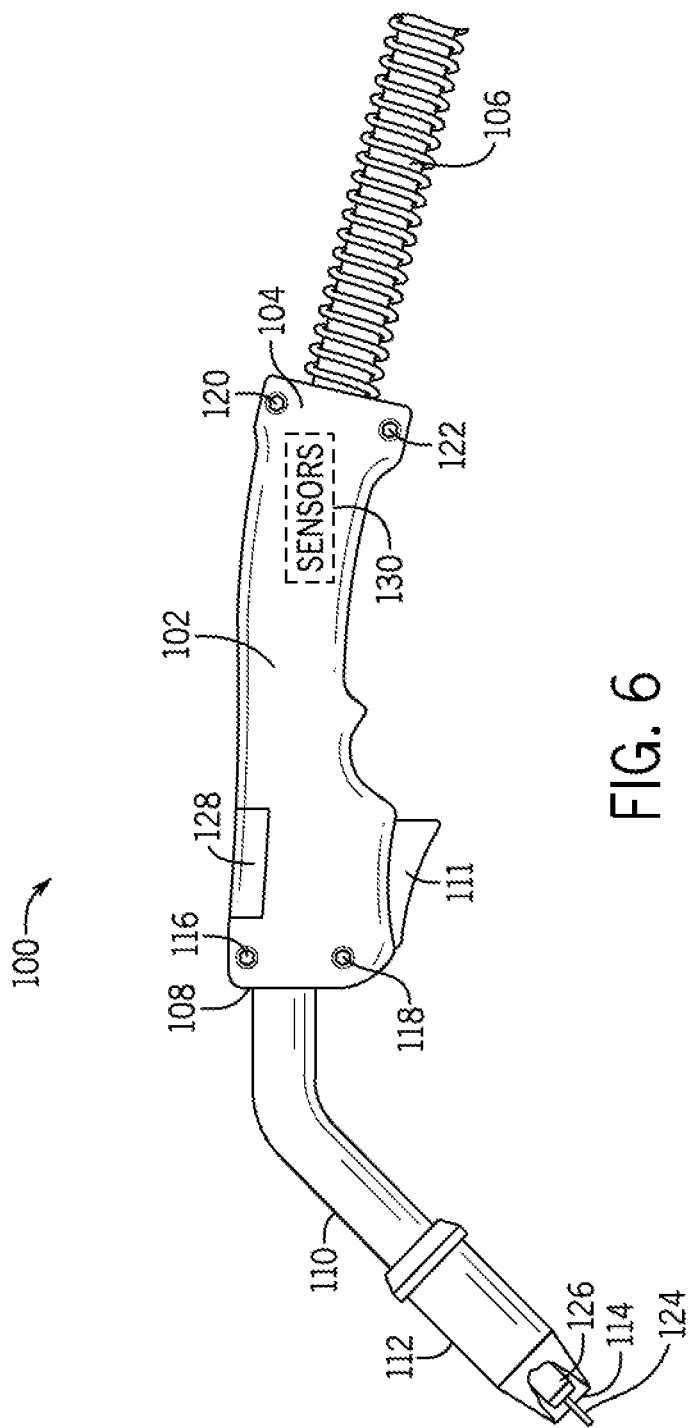
FIG. 6 is a perspective view of an embodiment of a welding torch 100 that may be used in the welding system of FIG. 1.

FIG. 6 illustrates a perspective view of an embodiment of a welding torch 100 that may be used in the welding system 10 of FIG. 1. The welding torch 100 includes a handle 102 for a welding operator to hold while performing a weld. At a first end 104, the handle 102 is coupled to a cable 106 where welding consumables are supplied to the weld. Welding consumables generally travel through the handle 102 and exit at a second end 108 opposite from the first end 104. The welding torch 100 includes a neck 110 extending out of the end 108. As such, the neck 110 is coupled between the handle 102 and a nozzle 112. As should be noted, when the trigger 111 is pressed or actuated, welding wire travels through the cable 106, the handle 102, the neck 110, and the nozzle 112, so that the welding wire extends out of an end 114 (i.e., torch tip) of the nozzle 112.

As illustrated, the handle 102 is secured to the neck 110 via fasteners 116 and 118, and to the cable 106 via fasteners 120 and 122. The nozzle 112 is illustrated with a portion of the nozzle 112 removed to show welding wire 124 extending out of a guide or contact tip 126 (or other guiding device). The guide tip 126 is used to guide the welding wire 124 out of the end 114 of the welding torch 100. Although one type of welding torch 100 is illustrated, any suitable type of welding torch may include the indicator 128. For example, a welding torch having the indicator 128 may be configured for shielded metal arc welding (SMAW), gas tungsten arc welding (GTAW), gas metal arc welding (GMAW), and so forth.

The welding torch 100 may also include one or more motion sensors 130 (e.g., accelerometer) that may detect motion of or near the welding torch 100. As previously discussed, by detecting motion via the welding torch 100, the welding system 10 may receive indications of activity or inactivity to control corresponding power management processes. In other words, by relying on the sensors 130, the welding system 10 may produce power when desired by increasing power production prior to actual demand (e.g., actuation of trigger 111) thereby enabling the welding system 10 to reduce power during inactivity without significant lag between power demand and availability of the power. For example, when the sensors 130 detect motion, the power supply 16 may provide power in anticipation of depression of the trigger 111.

Although the foregoing discussion primarily discusses motion sensing for a welding torch, some embodiments may include motion sensing for other tools or accessories. For example, motion sensing may be used for any welding-type tool or accessory associated with a welding-type process. As used herein, welding-type refers to any process related to welding, such as welding, cutting, or gouging. Furthermore, a welding-type tool or accessory may be any tool or accessory using in such processes. For example, welding-type tools may include torches, electrode holders, machining tools, or other similar tools that may be used in the welding-type processes. Moreover, welding-type accessories may include helmet, jackets, gloves, or other equipment that may be used in the welding-type processes.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
   sensing an initial orientation of a welding-type tool or accessory via a motion sensing system;
   sensing a subsequent orientation of the welding-type tool or accessory via the motion sensing system;
   determining, via the motion sensing system, that the welding-type tool or accessory has not moved for a duration of time;
   determining whether the duration of time exceeds a first threshold or a second threshold;
   when the duration of time exceeds the first threshold and the welding-type tool or accessory has not moved, placing an engine or engine-driven power supply in a first power state associated with a first engine speed; and
   when the duration of time exceeds the second threshold and the welding-type tool or accessory has not moved, placing the engine or engine-driven power supply in a second power state associated with a second engine speed, wherein the first and second power states are altered power generation states from a higher power state associated with a higher engine speed;
   activating the engine or engine-driven power supply associated with the welding-type tool or accessory to the higher power state if the power source is in the second power state and the subsequent orientation differs from the initial orientation; and
   activating the engine or engine-driven power supply to the higher power state for the power source if the power source is in the first power state and the subsequent orientation differs from the initial orientation.

2. The method of claim 1, wherein the first power state comprises an idle state for the power source.

3. The method of claim 1, comprising indicating a state of the power source by:
   providing visual feedback;
   providing audible feedback; or
   providing haptic feedback.

4. The method of claim 1, wherein the second power state comprises an off state.

5. The method of claim 1, wherein the motion sensing system comprises at least one of an accelerometer, a gyroscope, or a magnetometer.

6. The method of claim 1, further comprising:
   identifying, via the motion sensing system, one or more predefined gestures; and
   changing a corresponding weld process parameter by progressing through a plurality of welding-type process states based at least in part on the identified one or more predefined gestures.

7. The method of claim 1, wherein sensing the initial orientation comprises sensing a predefined orientation.

8. The method of claim 7, wherein the predefined orientation corresponds to an orientation indicative of idleness of the welding-type tool or accessory.

9. The method of claim 7, wherein the predefined orientation corresponds to the welding-type tool or accessory laying on its side, being upside down, or laying with a working end facing downward.

10. The method of claim 1, further comprising activating the engine or engine-driven welding power supply to the higher power state if the engine or engine-driven welding power supply is in the first power state or in the second power state and the subsequent orientation indicates that the welding-type tool or accessory is in an active state with respect to a plane parallel to a direction of gravity.

* * * * *